UNITED STATES PATENT OFFICE 2,418,422

LUBRICANT

Robert C. Palmer, East Chicago, Ind., assignor to Sinclair Refining Company, New York, N. Y., a corporation of Maine No Drawing. Application December 11, 1944, Serial No. 567,783

4 Claims. (Cl. 252—32.7)

The present invention relates to a mineral oil composition and more particularly to an improved mineral oil composition of special utility in the inhibiting of corrosion or rusting of metals.

Difficulty has heretofore been experienced in the shipping and storing, as well as in the use of machinery of various types, especially automotive equipment, due to corrosion of steel parts thereof, particularly when exposed to a humid atmosphere. The corrosion problem has been particularly troublesome in the environment of humid, sea atmosphere, or where the metal parts are exposed to sea water, or to condensates containing hydrobromic acid, resulting from the combustion of leaded fuels. The latter cause of corrosion is particularly prevalent in crankcases of internal combustion engines where such fuel is used.

The invention provides an improved mineral oil composition, especially adapted to the coating of such metal parts to prevent corrosion. The invention also provides an improved lubricating oil composition of particular utility as a crankcase oil for internal combustion engines. In general, this invention provides improved mineral oil compositions whereby corrosion of the steel parts of machines, due to condensation from humid atmosphere, or contact with sea water, or with a condensate containing hydrobromic acid, is substantially inhibited.

My improved mineral oil compositions are prepared by compounding calcium sulfonate and the reaction product of a diamylphenol and phosphorus pentoxide with a mineral oil base.

The reaction product of the diamylphenol and the phosphorus pentoxide, used in the preparation of my improved mineral oil compositions is hereinafter, for brevity, designated diamylphenyl phosphate. It has been found to be a mixture of the mono- and di-esters, but contains no substantial amount of the tri-ester. The reaction product may be defined more concisely as a mixture of mono- and di-(diamylphenyl) phosphate.

In the preparation of the diamylphenyl phosphate used in accordance with the present invention, I have, with advantage, used a distilled 2,4 diamylphenol in which the amyl groups are predominantly tertiary, but with small amounts of secondary amyl radicals present.

The diamylphenyl phosphate may be prepared as follows:

2,240 grams of the above-identified diamylphenol is heated to 200° F. and 454 grams of phosphorus pentoxide is slowly added portion-wise over a period of an hour or more while stirring. Before the addition of a further portion, the previously added portion is permitted to react substantially with the diamylphenol. During the addition of the phosphorus pentoxide, a slight amount of tarry material has been observed to collect on the stirrer and sides of the beaker, but this has not been found to interfere with the operation. After all of the phosphorus pentoxide has been added, the mixture is heated to 300° F. for 3 hours. During this heating the tarry material has been found to dissolve and the solution becomes clear. It is usually desirable to filter the resulting liquid to remove any insoluble material. However, when prepared as above described, less than 1 gram of insoluble material has been found upon filtration. In order to facilitate filtration of the reaction product, it has been found desirable to dilute the reaction product with a suitable solvent. For this purpose I have, with advantage, used an acid treated 100/100 viscosity Mid-Continent neutral in an amount by weight approaching that of the reaction product to be filtered. Tests of the reaction product prepared as above described have shown an acid No. of 191.2 and a phosphorus content of 8.09%.

Where the diamylphenol and the phosphorus pentoxide are rapidly admixed, I have found that there is a tendency toward the formation of lumps by the agglomerations of unreacted phosphorus pentoxide. Where the phosphorus pentoxide is added portion-wise, and each portion given substantial time to react before the next addition, it is possible to complete the reaction without any large lumps being formed. It has also been found that by heating the mixture to 300° F., a more complete reaction is obtained than when the heating is only to about 200° F.

The calcium sulfonate constituent of my improved mineral oil composition is, with advantage, used as a concentrate prepared as follows:

A raw Mid-Continent oil fraction of 220 SUS viscosity at 100° F. is acid-treated with 120 pounds of fuming sulfuric acid per barrel of oil and sludge thus formed is thoroughly separated from the acid-treated oil. The acid-treated oil is then air-blown to remove sulfur dioxide and again settled. The sulfonic acids or other acid products present in the oil are then neutralized by treatment with lime.

The amount of lime to be used in the treatment of the oil should be about twice that theoretically required to neutralize its acidity, as indicated by its neutralization number.

The lime is added with mechanical stirring at a rate such that it is well dispersed throughout the acid oil. The addition of lime usually requires 1 to 2 minutes. A small amount of water, say about 5%, is then added. The mixture is then stirred for about 2 hours at a temperature of 140-160° F., after which it is heated for an additional 2 hours at 210-220° F. to remove the major portion of the water. The dehydration is then completed by heating to about 290° F.

After complete dehydration 1-2% of a conventional filter aid is added and the oil is mechanically stirred for about 3 to 5 minutes. Thereafter the oil is filtered, for instance, through a 12 plate Schriver filter press. The resultant filtrate prepared as above described has been found to contain about 10% of calcium sulfonate and it may be used as a calcium sulfonate concentrate in the preparation of my mineral oil compositions.

Calcium sulfonate concentrates, so prepared, when blended with other mineral oil fractions have frequently been found to give spurious viscosities. The viscosity of the concentrate may be substantially reduced by heating at a temperature of 300-312° F. for about 2 to 2½ hours. By such treatment the SUS viscosity of the oil at 210° F. has been reduced from 110 seconds to 78 seconds in 2½ hours. Such a reduced viscosity has usually been found desirable where the concentrate is to be used in accordance with my present invention.

The mineral oil constituent to be used in the preparation of my mineral oil composition will depend primarily upon the purpose for which the composition is intended. Where the compounded oil is to be used for the lubrication and protection of internal combustion engines from rust, for instance, as a crank case oil, I have, with advantage, used as the lubricating oil constituent blends of conventionally finished (acid-treated) Mid-Continent neutrals and Mid-Continent bright stock. Other lubricating oil fractions or blends may be used to meet special lubrication requirements. A similar mineral oil constituent may be used in the preparation of compounds intended primarily for preventing or retarding the development of rust on exposed surfaces, but for such purposes the specification of the mineral oil constituent is less stringent.

The proportions of the calcium sulfonate and of the diamylphenyl phosphate used in the mineral oil compositions of the present invention, may be varied over a considerable range. The optimum proportion of these constituents will depend upon the intended purpose of the resultant composition and the conditions under which it is to be used. In compositions intended primarily for the protection of steel parts from corrosion, the proportion of diamylphenyl phosphate, based on the weight of the undiluted reaction product and the total weight of the mineral oil composition, may, with particular advantage, range from about 0.7% to 3%. The calcium sulfonate, is, with advantage, used as a concentrate as previously noted, and the optimum proportion will depend upon the concentration of calcium sulfonate in the concentrate. Using a concentrate prepared, as previously described, the proportions thereof used in the preparation of an oil composition, for the purpose just noted may, with advantage, range from about 14 to about 28% by weight.

In the preparation of oil compounds designed to lubricate internal combustion engines, as well as protect them from rusting, the proportion of diamylphenyl phosphate may, with particular advantage, vary within a range of about 0.7 to 1.1%, and the calcium sulfonate concentrate may, with advantage, be varied from about 24 to about 35%.

Various organic phosphates have previously been proposed as rust inhibitors. The oil compositions of my present invention are distinguished from such previously proposed inhibitors by the particular organic phosphate used and also by the addition of the calcium sulfonate. By the use of these two ingredients, a surprisingly effective rust inhibitor is obtained, the effectiveness of which cannot be accounted for by the characteristics of the individual constituents when used independently. While I am unable at present to account for this unexpected result, it is my present belief that the calcium sulfonate which is basic, reacts in some way with the diamylphenyl phosphate to form a new chemical compound, perhaps by combining with one of the free acid radicals of the phosphate group.

In addition to the mineral oil base, calcium sulfonate and diamylphenyl phosphate constituents, various other addends found effective as anti-oxidants, detergents, or the like may be included in my novel mineral oil compositions. A particularly effective lubricating oil composition contemplated by my present invention is one to which there has been added, in addition to the constituent previously described, a small proportion, say 2-3%, of the reaction product of zinc oxide, and an organic compound resulting from the reaction of the condensation product of turpentine and phosphorus pentasulfide with an alkylated phenol, more fully described in Patent 2,379,313, granted June 26, 1945, on an application of Robert L. May. Said reaction product may be prepared as follows:

Turpentine and $P_2S_5$ in molar proportions approximating 3:1 are caused to react by heating the turpentine in a vessel to about 200° F. and then without further heating slowly stirring in the $P_2S_5$ in powdered form. The heat of reaction is great, and, consequently, the sulfide should be added slowly so as to avoid the possibility of the reactions becoming uncontrollable. It is desirable that the temperature during this addition be not permitted to exceed about 250° F. although higher temperatures are permissible.

After the addition of phosphorus pentasulfide is completed and the exothermic heating is lessened, it is usually necessary to apply heat externally to complete the reaction. The temperature during this last stage is preferably maintained at about 300° F. though temperatures of about 200 to about 400° F. may be employed. The second stage of the reaction should be continued until all of the $P_2S_5$ is dissolved. The material thus prepared is a viscous liquid at elevated temperatures but, in the absence of excess turpentine, solidifies on cooling to room temperature.

The intermediate material used in the preparation of the zinc salt may be prepared by adding the alkylated phenol gradually to the turpentine-$P_2S_5$ condensation product, advantageously at a temperature of about 230° F. The optimum temperature of the condensation product for the introduction of the alkylated phenol will vary, depending upon the particular alkylated phenol used. After the alkylated phenol has been added, the mixture is maintained at an elevated temperature advantageously at about 200° F. or higher for about 1 hour with stirring. Thereafter, the zinc oxide is added and the mixture stirred for an additional hour, at the end of which time the temperature is slowly increased to about 275° F. or 300° F. Thereafter, the resultant product is filtered to remove any solid particles and this filtering may, with advantages, be facilitated by intimately admixing therewith a light petroleum lubricating oil fraction.

The molar proportions of $P_2S_5$, turpentine and alkylated phenol used may vary over a considerable range. Molar proportions of 2:6:3 have been used with particular advantage, assuming the molar weight of turpentine to be 136. However, for each mol of $P_2S_5$ there may be used 5 to 7 mols of turpentine and 1 to 5 mols of alkylated phenol, but it is desirable that the sum total of the number of mols of turpentine and the mols of alkylated phenol, for each two mols of $P_2S_5$ fall within the range of about 8 to 10. It is usually desirable to use an excess of zinc oxide and any unreacted zinc oxide will be removed by the subsequent filtration.

The materials just described have been found to be exceptionally effective oxidation and corrosion inhibitors in lubricants. When added to my mineral oil composition, they do not deleteriously affect the desirable characteristics of the composition but have been found materially to increase the anti-oxidation and anti-corrosion characteristics of the resulting composition in the presence of the other constituents.

In the preparation of these materials, various alkylated phenols may be used, as more fully described in the patent, previously noted. In the specific illustrations of its use, subsequently appearing herein, the particular alkylated phenol used was the diamylphenol previously identified herein, except as specifically indicated herein.

The invention will be more particularly described and illustrated by the following specific examples of its application. It will be understood, however, that the utility of the invention is not limited to the particular proportion and characteristics of the constituents therein described.

Illustrations of mineral base oils which may with advantage be used in accordance with my present invention, and which were used in the blends of the following specific examples, are as follows:

Table I

| Base Oil | A | B | C | D | E |
|---|---|---|---|---|---|
| Gravity, ° API | 26.8 | 25.0 | 27.2 | 24.7 | 24.6 |
| Flash, ° F | 365 | 395 | 420 | 450 | 510 |
| Fire, ° F | 405 | 455 | 475 | 510 | 595 |
| Vis. at 100° F. SUS | 109.4 | 206.5 | 207.7 | 402.9 | 2,011.6 |
| Vis. at 210° F. SUS | 39.2 | 44.4 | 45.9 | 53.8 | 120.5 |
| Vis. Index | 44.2 | 51.4 | 82.0 | 64.0 | 81.3 |
| Pour | +20 | +15 | 0 | +10 | −5 |
| Color | 2 | 2½+ | 2− | 3− | 6− |
| Carbon Residue | 0.02 | 0.02 | 0.02 | .05 | 1.15 |
| Ash | 0.0 | 0.00 | 0.0 | | 0.01 |
| Sulfur, per cent | | 0.39 | 0.24 | | |

Each of these oils is a conventionally refined Mid-Continent petroleum lubricating oil fraction, A, B, C and D being acid-treated Mid-Continent neutrals, and E being a Mid-Continent bright stock.

Illustrations of calcium petroleum sulfonate concentrates which may with advantage be used in accordance with the present invention, and which were used in the following specific examples, are as follows:

Table II

| | F | G | H | I | J |
|---|---|---|---|---|---|
| Gravity, ° API | 29.0 | 27.5 | 27.6 | 26.4 | 28.8 |
| Flash, ° F | 425 | 410 | 400 | 410 | 425 |
| Fire, ° F | 480 | 465 | 465 | 475 | 475 |
| Vis. at 100° F | 383 | 1225.1 | 430.3 | 514.9 | 413.9 |
| Vis. at 130° F | 183.9 | 502.3 | 213.3 | 233.2 | 200.1 |
| Vis. at 210° F | 68.7 | 110.0 | 66.0 | 68.0 | 65.2 |
| Color | 4½+ | 3+ | 3+ | 4+ | 4½+ |
| Acid Number | 2.5 | 2.5 | 1.95 | 3.28 | 2.8 |
| | Basic | Basic | Basic | Basic | Basic |
| Calcium, per cent | 0.500 | 0.396 | 0.403 | 0.584 | 0.498 |
| Sulfur, per cent | 0.65 | | | | |

The characteristics of the diamylphenyl phosphate used in the following specific examples are set forth in the following tabulation:

Table III

| | K | L |
|---|---|---|
| Gravity | 5.7 | 12.5 |
| Acid No | 190.3 | 112.4 |
| Sulfur, per cent | | 0.24 |
| Phosphorus, per cent | 8.09 | 4.50 |

Item K above is a substantially pure diamylphenyl phosphate, but item L contains about 40% by weight of 100/100 viscosity Mid-Continent conventional refined neutral oil.

The analysis of the reaction product of zinc oxide and the compound resulting from the reaction of the condensation product of turpentine and phosphorus pentasulfide with an alkylated phenol used in the following specific examples and the constituents and proportions thereof used in their production, are set forth in the following tabulation:

Table IV

| Item | M | N | O | P | Q | R | S | T |
|---|---|---|---|---|---|---|---|---|
| Mol. Ratio $P_2S_5$:Turp.:Phenol | 2:6:3 | 2:6:2 | 2:6:3 | 2:6:3 | 2:6:3 | 2:5:3 | 2:6:2 | 2:6:3 |
| Phosphorus, per cent | 2.70 | 2.62 | 2.99 | 3.11 | 3.11 | 3.67 | 3.20 | 3.24 |
| Sulfur, per cent | 7.83 | 7.63 | 6.27 | 8.02 | 8.28 | 10.28 | 9.36 | 8.33 |
| Zinc, per cent | 0.13 | 0.12 | 0.115 | 0.19 | 0.23 | 0.18 | 0.09 | 0.014 |

In the preparation of the foregoing item M, a codimer alkylated phenol was used and in the items N and O, a codimer bottoms alkylated phenol was used. In the preparation of items P, Q, R, S and T, the alkylated phenol used was the diamylphenol previously described herein. The codimer alkylated phenols were prepared by reacting, in the presence of sulfuric acid, phenol with the olefines of commercial codimers resulting from the phosphoric acid polymerization of mixed olefines of 4 carbon atoms or less per molecule, and comprising propylene, butylene-1, butylene-2 and iso-butylene, the codimer consisting of a major proportion of $C_8$ olefines, together with some $C_6$, $C_7$, $C_8$, $C_9$, $C_{10}$, $C_{11}$ and $C_{12}$, and higher olefines. The codimer alkylated phenols used were comprised primarily of mono- and polyalkylated phenols having alkyl groups, as noted above, but with $C_8$ alkyl groups predominating.

The codimer bottoms, alkyl phenol were prepared by reacting the phenol as above described with the bottoms obtained by a redistillation of the previously described codimer to a 350 to 360° F. end point overhead. This bottoms was comprised primarily of $C_{12}$ olefines but contained some somewhat lower and some somewhat higher molecular weight olefines.

Specific examples of mineral oil compositions, which have been found to be particularly effective in protecting steel from corrosion, are set forth in the following tabulation in which the letters signify substances similarly identified in the foregoing Tables I, II, III and IV. In each instance, the particular compound disclosed has successfully met the requirements of the 300 hour humidity cabinet test and also the synthetic sea water immersion tests described by the Ordnance Department, U. S. Army, Tentative Specification AXS–674 (Rev. 2), of September 11, 1943.

Table V

| Constituents | Base Oil | | Calcium Sulfonate | Diamylphenyl Phosphate | | |
|---|---|---|---|---|---|---|
| | B | C | E | F | K | L |
| | Per cent | Per cent | Per cent | Per cent | Per cent | Per cent |
| Example I | 48.0 | | 36.0 | 14.0 | 2.0 | |
| Example II | 47.0 | | 36.0 | 14.0 | 3.0 | |
| Example III | 33.5 | | 44.0 | 21.0 | 1.5 | |
| Example IV | 27.3 | | 44.0 | 28.0 | 0.7 | |
| Example V | | 26.3 | 44.0 | 28.0 | | 1.7 |
| Example VI | 26.5 | | 44.0 | 28.0 | 1.5 | |
| Example VII | 26.0 | | 44.0 | 28.0 | 2.0 | |
| Example VIII | | 26.6 | 42.0 | 28.0 | | 3.4 |
| Example IX | 33.0 | | 36.0 | 28.0 | 3.0 | |

Examples of mineral oil compositions of my present invention which have been found particularly effective for use as crankcase lubricating oils in mobile equipment and in preventing corrosion of steel due to condensate in humid atmosphere, contact with sea water and condensate containing hydrobromic acid, are set forth in the following tabulation, the letters signifying materials similarly identified in the preceding Tables I, II, III and IV and the amounts indicated being in parts by weight. Each of the compounds illustrated has successfully passed the 200 hour humidity cabinet test, the 20 hour sea water immersion test, and the hydrobromic acid neutralization test described in the Ordnance Department, U. S. Army, Tentative Specification, AXS–934 of April 11, 1943.

of turpentine and phosphorus pentasulfide has been added, are of particularly a utility where the lubricant is to be used in the lubrication of copper-lead alloy bearings. The addition of this addend to my lubricating oil composition has been found to inhibit corrosion of such bearing metal. The resultant compositions are likewise particularly stable with respect to oxidation and sludging of the oil.

I have previously noted that the diamylphenyl phosphate constituent appears to combine chemically in some way with the calcium petroleum sulfonate constituent subsequent to the blending of these constituents with the base oil. It also seems likely that the above-noted addend chemically reacts to some extent, at least, with the calcium petroleum sulfonate.

The advantages derived from this aspect of my invention are further illustrated by tests carried out by conventional methods, including tests for determining oil deterioration and bearing metal corrosion, made in accordance with the procedure recommended by the American Society of Testing Materials published October, 1942, and entitled "Proposed Method of Test for Oxidation Characteristics of Heavy Duty Crankcase Oils," and conventionally known as the "Chevrolet engine test," and also tests carried on in accordance with the method conventionally known as "heavy duty oil oxidation test," a modification of the test usually designated Best, the test used being herein designated HDOOT.

Example XXIV

The composition tested was an S. A. E.–10 grade lubricant and was prepared from the following ingredients and proportions thereof, the reference letters in this and in the following examples designating materials similarly identified in the preceding Tables I, II, III and IV.

| | Per cent |
|---|---|
| Base oil, A | 41.7 |
| Base oil, B | 5.0 |
| Base oil, E | 15.0 |
| Calcium sulfonate, H | 34.3 |
| Diamylphenyl phosphate, K | 0.7 |
| Addend, O | 3.0 |
| Santopour | 0.3 |

When subjected to the 36 hour Chevrolet engine test, the lubricating oil composition was found to have a varnish rating of 50 and a sludge rating of 44. The copper-lead bearing corrosion Table VI

| Constituents | Base Oil | | | | Calcium Sulfonate | | | | Diamylphenyl Phosphate | | Other addend | | | | | | | |
|---|---|---|---|---|---|---|---|---|---|---|---|---|---|---|---|---|---|---|
| | A | B | D | E | G | H | I | J | K | L | M | N | O | P | Q | R | S | T |
| Example X | 52.5 | | | 10.0 | 35.0 | | | | 0.7 | | 2.5 | | | | | | | |
| Example XI | 52.5 | | | 10.0 | 35.0 | | | | 1.1 | | 2.5 | | | | | | | |
| Example XII | 40.0 | 7.5 | | 15.0 | 35.0 | | | | 0.7 | | 2.5 | | | | | | | |
| Example XIII | 40.0 | 7.5 | | 15.0 | 35.0 | | | | 1.1 | | 2.5 | | | | | | | |
| Example XIV | 41.7 | 19.3 | | 15.0 | | | 24.0 | | 0.7 | | | | | 2.4 | | | | |
| Example XV | 41.8 | 15.2 | | 15.0 | | | | | 28.0 | 0.7 | | | | | 2.4 | | | |
| Example XVI | 41.8 | 15.2 | | 15.0 | | | | | 28.0 | 0.7 | | | | | | 2.16 | | |
| Example XVII | 41.8 | 15.2 | | 15.0 | | | | | 28.0 | 0.7 | | 2.68 | | | | | | |
| Example XVIII | 41.8 | 15.2 | | 15.0 | | | | | 28.0 | 0.7 | | 2.68 | | | | | 2.08 | |
| Example XIX | 41.7 | 5.0 | | 15.0 | | 34.3 | | | | 0.7 | | | 3.0 | | | | | |
| Example XX | | 19.8 | 12.0 | 30.0 | | 34.3 | | | | 0.7 | | | 3.0 | | | | | |
| Example XXI | 43.1 | 10.0 | | 15.0 | | | | | 28.0 | 1.2 | | | | | | | | 2.4 |
| Example XXII | | 33.1 | | 35.0 | | | | | 28.0 | 1.2 | | | | | | | | 2.4 |
| Example XXIII | | 33.1 | | 35.0 | | | | | 28.0 | 1.2 | | | | | | | | 2.4 |

My lubricating oil compositions, to which the reaction product of zinc oxide and an organic compound resulting from the reaction of the alkylated phenol with the condensation product loss was 0.374 gram per bearing. The used oil had a neutralization number of 2.88 and the viscosity rise was relatively small.

When subjected to the HDOOT test, the roof deposit was 2.1 grams and copper-lead bearing corrosion loss was 8.7 milligrams. The condition of the sump was clean and there was only a relatively low viscosity rise.

*Example XXV*

The composition tested was of an S. A. E.-30 grade and was prepared from the following ingredients and proportions thereof:

|  | Per cent |
|---|---|
| Base oil, B | 19.8 |
| Base oil, D | 12.0 |
| Base oil, E | 30.0 |
| Calcium sulfonate, H | 34.3 |
| Diamylphenyl phosphate, K | 0.7 |
| Addend, O | 3.0 |
| Santopour | 0.2 |

When subjected to the 36 hour Chevrolet engine test, the composition was found to have a varnish rating of 49 and a sludge rating of 47. The copper-lead bearing corrosion loss was 0.32 gram per bearing. The used oil was found to have a neutralization number of 2.50 and a relatively low viscosity rise.

When subjected to the HDOOT test the roof deposit was 1.6 grams, the copper-lead bearing corrosion loss was 6.0 milligrams, the sump was clean and the viscosity rise was relatively low.

*Example XXVI*

The composition tested was an S. A. E.-30 grade and was prepared from the following ingredients and proportions thereof:

|  | Per cent |
|---|---|
| Base oil, B | 30.7 |
| Base oil, D | 12.0 |
| Base oil, E | 30 |
| Calcium sulfonate, I | 24.0 |
| Diamylphenyl phosphate, K | 0.7 |
| Addend, P | 2.4 |
| Santopour | 0.2 |

When subjected to the 36 hour Chevrolet engine test, the composition was found to have a varnish rating of 49 and a sludge rating of 47. The copper-lead bearing corrosion loss was 0.163 gram per bearing. The neutralization number of the used oil was 2.10 and the viscosity rise was relatively low.

*Example XXVII*

The composition tested was an S. A. E.-30 grade of lubricant, and was prepared from the following ingredients and proportions thereof:

|  | Per cent |
|---|---|
| Base oil, C | 33.1 |
| Base oil, E | 35.0 |
| Calcium sulfonate, J | 28.0 |
| Diamylphenyl phosphate, L | 1.2 |
| Addend, T | 2.4 |
| Santopour | 0.3 |

When subjected to the 36 hour Chevrolet engine test, the composition was found to have a varnish rating of 43 and a sludge rating of 46. The copper-lead bearing corrosion loss was only 0.060 gram per bearing. The neutralization number of the used oil was 2.4, and the viscosity rise was relatively low.

No particular precautions are necessary in the compounding of the oil compositions. The various ingredients may be added to the base oil, or blends of various base oils, by conventional methods and thoroughly dispersed therein by agitation. As previously noted, the several addends may be dissolved in a portion of mineral oil to facilitate filtration and handling, and this should be taken into account in determining the proportions of base oil and of the addends to be used.

I claim:

1. A mineral oil composition comprising a major proportion of mineral oil with which there have been blended about 14 to 28% of calcium petroleum sulfonate and about 0.7 to 3% of a mixture of mono- and di-(diamylphenyl) phosphates.

2. A mineral oil composition comprising a major proportion of mineral oil with which there have been blended about 24 to 35% of calcium petroleum sulfonate, about 0.7 to 1.1% of a mixture of mono- and di-(diamylphenyl) phosphates and about 2 to 3% of the reaction product of zinc oxide and an organic compound resulting from the reaction of an alkylated phenol with the condensation product of turpentine and phosphorus pentasulfide, the alkyl group of the alkylated phenol being a saturated aliphatic radical.

3. A mineral oil composition comprising a major proportion of a mineral oil with which there have been blended a minor proportion of calcium petroleum sulfonate and of a mixture of mono- and di-(diamylphenyl) phosphates, the proportion of the sulfonate being within the range extending from about 14% to about 35% and the proportion of the phosphate being within the range extending from about 0.7 to about 3%.

4. A mineral oil composition comprising a major proportion of a mineral oil with which there have been blended about 2 to 3% of the reaction product of zinc oxide and an organic compound resulting from the reaction of an alkylated phenol with the condensation product of turpentine and phosphorus pentasulfide, the alkyl group of the alkylated phenol being a saturated aliphatic radical, an amount of calcium petroleum sulfonate within the range extending from about 14% to about 35% and an amount of a mixture of mono- and di-(diamylphenyl) phosphates, within the range extending from about 0.7 to about 3%.

ROBERT C. PALMER.

REFERENCES CITED

The following references are of record in the file of this patent:

UNITED STATES PATENTS

| Number | Name | Date |
|---|---|---|
| 1,844,400 | Kobbe | Feb. 9, 1932 |
| 1,926,687 | Palmer | Sept. 12, 1933 |
| 1,963,084 | Gardner | June 19, 1934 |
| 2,242,260 | Prutton | May 20, 1941 |
| 2,270,577 | Bergstrom | Jan. 20, 1942 |
| 2,167,867 | Benning | Aug. 1, 1939 |
| 2,285,853 | Downing | June 9, 1942 |
| 2,285,855 | Downing | June 9, 1942 |